United States Patent [19]
Windsor, Jr.

[11] Patent Number: 4,787,417
[45] Date of Patent: Nov. 29, 1988

[54] ROTARY PRESSURE/PURGE VALVE

[76] Inventor: John F. Windsor, Jr., 4501 Raymar Dr., Orlando, Fla. 32809

[21] Appl. No.: 124,568

[22] Filed: Nov. 24, 1987

[51] Int. Cl.$^4$ ............................................. F16K 11/14
[52] U.S. Cl. ................................ 137/624.13; 55/179; 55/389; 137/596.17
[58] Field of Search ............................. 55/179, 389; 137/624.13, 596.17

[56] References Cited
U.S. PATENT DOCUMENTS

| | | |
|---|---|---|
| 4,027,697 | 6/1977 | Bonney . |
| 4,038,054 | 7/1977 | Graff . |
| 4,272,265 | 6/1981 | Snyder . |
| 4,469,494 | 9/1984 | Van Weenem . |

Primary Examiner—Gerald A. Michalsky
Attorney, Agent, or Firm—Julian C. Renfro

[57] ABSTRACT

A rotary pressure/purge valve for supplying pulsation free oxygen without the use of an interim oxygen storage tank in the nature of a surge tank or accumulator. This valve is comprised of an air chamber section and a center section, with the air chamber section having an inlet port for compressed air, and the center section having a plurality of passages therein, disposed at equal intervals from each other and with respect to a centerline common to both sections. First valves are operatively associated with first passage ends, and serve to control the entry of charging air into two adjacent passages at the same time. Second valves are operatively associated with second ends of the passages and serve to control the exit of purging air from the passages. A shaft on the centerline of the center section serves to operate the first and second valves, with the valves being set out of phases such that when a first end of a given passage is closed to the entry of charging air, the other end of that passage is open to a flow of purging air, and vice versa. At a given moment compressed air can flow in one direction through at least one of the first valves and an associated passage, contemporaneously with purging air flowing in a different direction through a different one of the passages. This valve is able to deliver oxygen of a particularly high quality direct to a patient/user on demand.

28 Claims, 4 Drawing Sheets

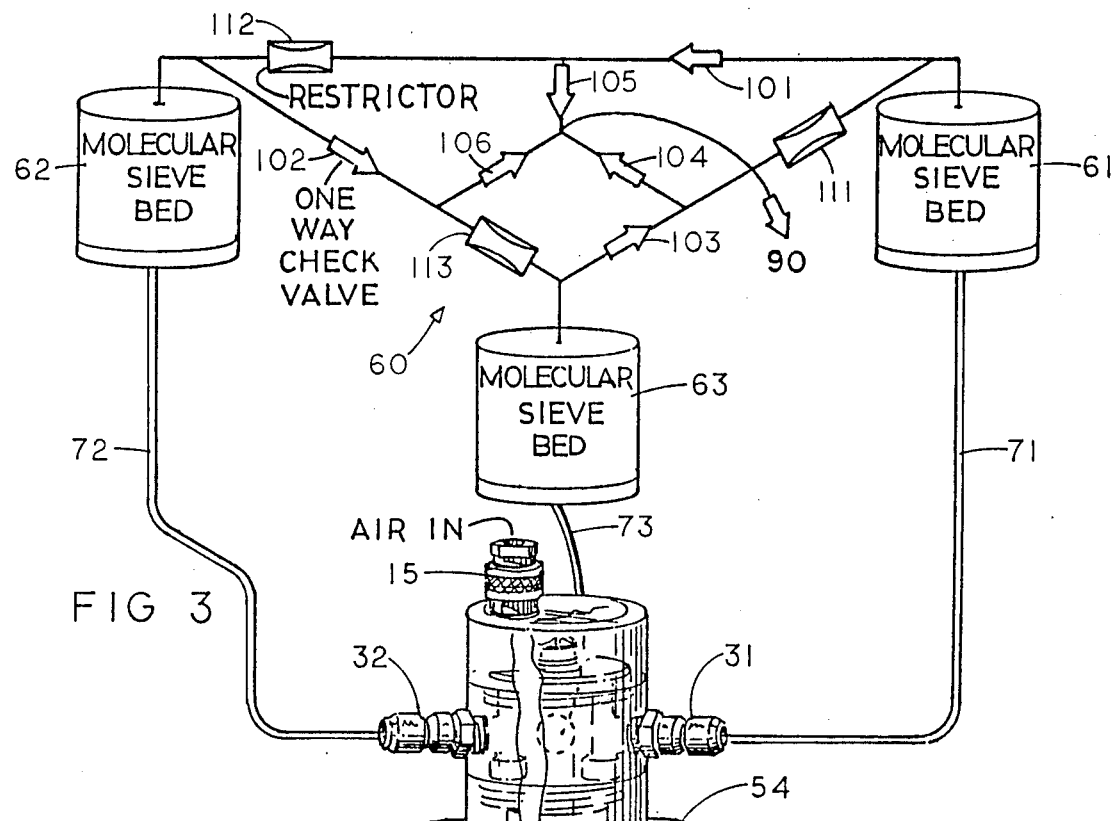

FIG 10 WINDSOR VALVE

ROTARY PRESSURE/PURGE VALVE

BACKGROUND OF THE INVENTION

This invention relates specifically to the pressure swing method of generating breathing oxygen utilizing a particular type of complex inorganic silicate known as "molecular sieve", which has an affinity for nitrogen, carbon monoxide, carbon dioxide, water (vapor) and all hydrocarbons, but freely passes oxygen and other gases. By a method known to those well versed in this science, this material is packed into cylindrical containers, in order to create what is known as sieve beds. These containers are then selectively subjected to a stream of compressed air, resulting in oxygen enriched air at the outlet port of the sieve beds. Various mechanical and electronic components have been utilized in known prior art devices in an effort to time and regulate the internal operating parts which bring about the necessary steps of alternately charging the sieve beds with compressed air, and then back flushing or purging them of nitrogen and the other captured gases.

The novel valve in accordance with this invention is intended as a simple reliable alternative for all the "over engineered," unnecessarily complicated components and parts that characterize the state of the art devices now being used to generate breathable oxygen in home use machines.

Home use oxygen concentrators come in many sizes and shapes, and such prior art devices share two important things in common:

First, they are extremely valuable devices for respiratory patients who require around the clock oxygen therapy. They manufacture breathing oxygen instantly on the spot, as it is used. The oxygen concentrators therefore eliminate the need, bother and expense of the familiar large green oxygen tanks, which are regarded by many as quite dangerous because of the very high pressure to which they are typically charged.

Second, the prior art devices are finicky, prone to malfunction, and very expensive, complicated "busy" machines.

Generally, all prior art oxygen concentrators in public use today consist of three basic components;
1. An air compressor.
2. One or more molecular "sieve beds".
3. A combination of various mechanical and electronic devices designed to time, regulate, charge, and purge the molecular sieve bed(s).

Item #3 above represents the area where mechanical failure is most common in these machines, and it is this area that the rotary pressure/purge valve in accordance with this invention directly addresses. It is also the area that usually results in an inordinate financial burden largely due to the fact that when a timing or regulating device fails, it almost always destroys the oxygen producing capability of the molecular sieve beds. Simple internal failures of an oxygen concentration machine therefore usually escalate to a major failure, requiring sieve bed replacement and total overhaul of the machine, costing several hundred dollars. It is because of these undesirable shortcomings of present day prior art machines, that the novel valve in accordance with this invention was developed in an effort to improve reliability.

As in the rotary valve system utilized in the U.S. Pat. No. 4,272,265 to Fred P. Snyder, the instant rotary valve also uses internal rotating components to control pressurization and purging of the molecular sieve beds. These internal components are, however, of a different type, composition and function.

Whereas the Snyder rotating components consist of two flat plate discs with drilled holes at a specific angular relationship, the present invention utilizes sector shaped components making possible the attainment of a novel and highly advantageous pressure overlap feature as will be seen hereinafter in FIGS. 10 and 11, that greatly increases flexibility and efficiency, and entirely eliminates the undesirable pulsations in the oxygen output flow that characterized the functioning and operation of the prior art, as will be hereinafter noted from FIGS. 8 and 9.

SUMMARY OF THE INVENTION

The instant rotary valve preferably makes use of an external interconnect manifold in the oxygen concentration system. This interconnect manifold contains several one way check valves and at least three airflow restrictors utilized to better control, dampen, and regulate the oxygen product output of the rotary valve system. The interconnect manifold is not an integral component of the instant rotary valve, but its function is important to the efficient routing and distribution of the gaseous flow within an oxygen concentration machine. The unique combination and arrangement of one way check valves and 1/16th of an inch orificed line restrictors I prefer to use function in such a way as to force the gaseous oxygen product present within the interconnect manifold to move in a circular direction within the manifold. This movement is in such a way as to result in approximately 10 percent of the oxygen product being delivered to the product outlet for patient consumption, with the remaining approximately 90 percent of the oxygen being directed to the particular sieve bed undergoing back flushing or purging in order to "re-oxygenate" or prepare the sieve bed for its next pressurization cycle.

The use of one way check valves and airflow restrictors in the instant rotary valve system, in concert with the phased and regulated timing of the rotary valve internal component parts, results in a relationship which allows for total elimination of an oxygen storage tank or vessel of any kind because of the continuous positive pressure they cause to be exerted on the interconnect manifold, which is bled off and fed directly to a patient without the need for interim storage. In contrast, the system set forth in Snyder's U.S. Pat. No. 4,272,265 mentions that he uses no check valves, but it should be noted that his system apparently requires a storage container in order to smooth out what appears to be a continuous series of individual and independent pulsations in the flow of oxygen to the consumer, as will be seen hereinafter in FIGS. 8 and 9.

With regard to the internal components of my device, one component serves as a rotating pressure distribution "sector disc," hereinafter referred to as the "sector member," and another serves as an exhaust "cam disc," hereinafter referred to as the "cam member." As will be seen in considerable detail hereinafter, these components are placed in a relationship such that a highly advantageous result is obtained, that is, a constant pressure overlap feature that eliminates pressure surges and utilizes the molecular sieve beds at their full potential, as will be herein seen in FIGS. 10 and 11. These advantages are apparently not achieved by a device utilizing the valving relationships set forth in the Snyder patent, or for that matter, as described in any known patent of the prior art. Such prior art devices resort to a system which by their nature, deliver the oxygen product in pulses rather than a smooth flow.

The rotary components of the instant valve are preferably driven by a separate remotely mounted, quick disconnect electric hysteresis synchronous instrument motor chosen for ease of maintenance and simplicity of design. The drive shaft of the valve is shaped in such a manner as to just plug into a fitting attached to the drive motor shaft. The drive motor can be of any RPM value consistent with maximum oxygen concentration output for a particular combination of factors related to producing oxygen from a selected concentration machine design. The instant valve lends itself equally to all reasonable capacity machines simply by instantly coupling it onto a drive motor of the appropriate RPM. This is in contrast to the electric drive motor rigidly and permanently attached as an integral part of the Snyder rotary valve, which serves to strictly limit the Snyder rotary valve to a single specified RPM/sieve bed capacity system. This combination single unit rotary valve/motor configuration also adds to the number of parts subject to failure within the total valve assembly or housing.

The instant rotary valve is advantageously designed as a totally disposable unit. It thus requires no maintenance at all, other than complete removal and replacement if and when failure occurs. The valve is preferably constructed of transparent injection molded plastic of a type compatible with the heat and pressure the valve is typically subjected to in a compressed air system. Transparency facilitates inspection of its operation allowing a repair technician to determine at a glance whether or not the valve is malfunctioning. This novel valve is designed to integrate into a specially constructed oxygen concentration machine utilizing only quick disconnect fasteners. This is to say, all pressure hose connections are of the quick disconnect male/female type hose couplers. Physical attachment (or removal) of the valve to the machine proper is accomplished by inserting (or removing) three or more spring loaded quick disconnect pins. This arrangement results in a combination of components which require only a few seconds for removal and replacement of the valve rather than several minutes or hours as is the case in all prior art machines utilizing other types of timing and regulating devices. Whereas the Snyder rotary valve system asserts ease of maintenance, the instant rotary valve, due to its unique disposable, quick attachment, quick disconnect features, in fact entirely eliminates rotary valve maintenance altogether, as no provision will be made for repairing or replacing any of the internal moving parts. The center core section of the valve containing the moving parts is envisioned to be the primary disposable portion of the valve. The air chamber section and the base sections are reusable indefinitely, except in instances where actual physical damage has occurred. Such a provision allowing for an advantageous, very low cost of parts replacement is extremely significant.

As opposed to the Snyder assertion of ease of maintenance, the above-mentioned quick disconnect and disposable features of the instant valve manifestly guarantees the following:

1. This novel machine can be serviced by a relatively inexperienced technician, such that a high degree of satisfactory results will be obtained.

2. In most cases, the entire working portion of the valve can be replaced in an absolute minimum of time and, at a cost equal to or less than that now required for just the repair kits required to repair malfunctioning components of present oxygen concentrator machines now in use.

3. Because the instant valve is not prone to failure, there is substantially less jeopardy to the ancillary components of a given system. charged, electrically driven rotary valve is designed to simultaneously pressurize and purge a "bank" of three sieve bed tanks by the pressure swing method, in a home use machine commonly known as an oxygen concentrator.

It contains within its housing, two spring loaded, self adjusting, discs permanently fixed to the central drive shaft, which rotate and meter compressed air and exhaust or purge air in a precise manner during a precise time frame.

Compact, measuring less than three inches in diameter and less than four inches high, it decreases the amount of space required to house the "cycling" component parts now generally in use, and provides a continuous flow of oxygen directly to the patient. This continuous flow action eliminates the need for a separate oxygen storage tank, thus achieving an overall total space saving of better than 90% over present day components. This is an important consideration inasmuch as it allows the entire oxygen concentration machine to be "down sized," thus resulting in better warehousing/storage capacity, lower shipping costs, user ease of handling, and less obtrusive presence in the sick room.

My novel valve eliminates the "push pull" surges of pressure and pulsations of oxygen to be found in all one sieve bed and two sieve bed home use machines now on the market. The "push pull" surges of pressure and pulsations of resulting oxygen product also appear to be an intrinsic feature of the aforementioned three sieve bed system as depicted in Snyder's FIG. 11, and also depicted in expanded form in FIGS. 8 and 9 of the instant case. It is to be realized that the present invention achieves extra boost from the effective use of a third sieve bed, and therefore produces an unusually high concentration of oxygen while expending less energy in the One objective of providing a valve possessing the particular design and structure of the present invention is to facilitate critical primary component inspection and replacement with an absolute minimum of "down time," thereby realizing as complete utilization of the machine as is possible.

Specifically designed as an economical "throw away" disposable unit, the present valve clearly eliminates all costly repairs or maintenance. A repairman of average experience can service the machine with ease and with satisfactory results, thereby eliminating the need for a costly, highly trained "technician."

An outstanding feature of my invention is the use of a rotating sector member enabling compressed air to be selectively distributed to each of a plurality of passages leading to respective sieve beds, with this sector member advantageously making it possible to attain a constant pressure overlap feature not attained by prior art devices, that effectively eliminates the need for a tank utilized to remove pulsations from the flow of oxygen to the delivery point.

It is therefore a primary object of my invention to provide an economical machine for producing oxygen of a particularly high quality on an as-needed basis in a reliable manner, and without undue equipment or expense.

It is another object of my invention to supply "pulsation-free," high quality oxygen at low cost, by the use of a machine of minimum cost and minimum weight.

It is still another object of my invention to provide a rotary pressure/purge valve utilizing a novel sector member advantageously making it possible to obtain a constant pressure overlap feature not attained in prior art oxygen supplying devices, which novel construction effectively eliminates the need for a tank utilized to remove pulsations from the flow of oxygen to the delivery point.

It is yet still another object of my invention to provide a novel rotary valve configuration that will supply air under pressure to a plurality of molecular sieve beds in an optimum fashion, and thereafter reliably backflush or purge the sieve beds of nitrogen and other captured gases, with this being accomplished at a minimum of expense and necessary equipment.

Yet another object of my invention is to provide a reliable, most versatile compact component that without modification or adjustment of any kind, can be used in any oxygen concentration machine of reasonable capacity. It can be installed in any properly designed oxygen concentration machine, "mini," "maxi," "standard," "console," or whatever, which makes it for the first time the one constant, truly standardized part to fit all size (capacity) machines. Prior art machines do not contain standardized component parts, for "mini" parts are not interchangeable with "maxi" parts etc. A requirement therefore presently exists for maintaining a large inventory of various non-interchangeable parts with which to service various machines of the prior art that are in use at this time. The instant rotary valve very effectively eliminates the replacement parts problem.

An additional object of my invention is to provide an extremely efficient and compact component which will allow "down sizing" of a full size capacity machine, for example, one that produces 3 to 5 liters of oxygen at 95% or better concentration at 5 psi, down to a physical presence which will conveniently fit into a small suitcase. Typically, prior art machines of this capacity are relatively large and weigh in the vicinity of 100 to 130 pounds, whereas my machine will at most weigh only half that much.

BRIEF DESCRIPTION OF DRAWINGS

FIG. 3 is a view showing my novel valve in assembled relation, here being revealed in connection with three molecular sieve beds, which collectively serve to provide pulsation-free oxygen to a selected point of use;

FIG. 4 is a perspective view of a simplified version of the center section, showing the rotatable sector member in a first position with respect to the three passages;

FIG. 4A is a view of the underside of the center section, with the cam member shown in a position consistent with the position of the sector member in FIG. 4;

FIGS. 5 and 5A are related views in the nature of FIGS. 4 and 4a, showing the sector member in a second position with respect to the three passages, with the cam member in a consistent position with respect to the sector member;

FIGS. 6 and 6A are further related views, here showing the sector member in a third position with respect to the three passages, with the cam member in a consistent position with respect to the sector member;

FIG. 10 depicts the operation of the instant valve in comparison with prior art FIG. 8 illustrated herein, with the sieve beds being independently pressurized by the unusual valving action accomplished by the interaction of the sector member, cam member, and ball valves in accordance with this invention, to produce a unique pressure overlap serving to effectively eliminate pressurization pulses at the product outlet;

DETAILED DESCRIPTION

Figure 1:
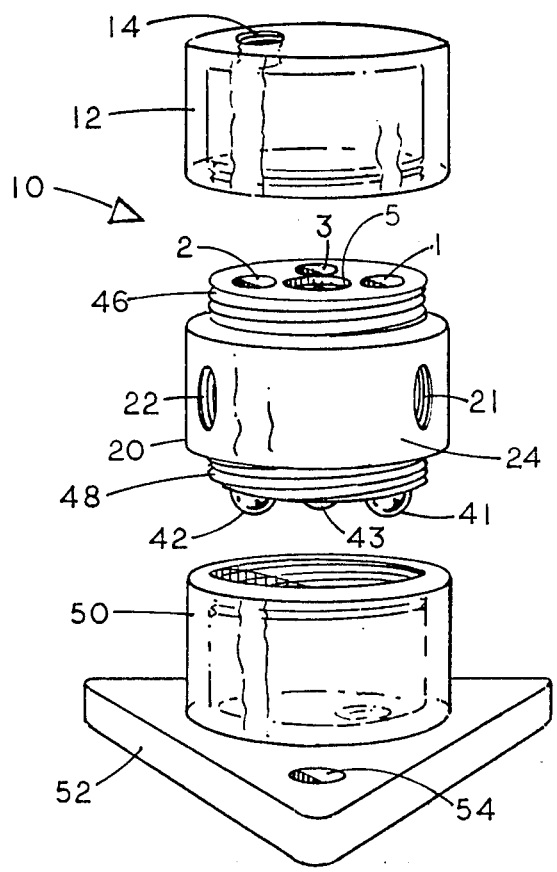
FIG. 1 represents the principal components of my novel pressure/purge valve, illustrated in exploded relation some of the essential components of the valve.

Turning to FIG. 1 it will there be seen that I have shown in exploded relation, a preferred embodiment of a valve 10 in accordance with this invention, involving an air chamber section 12 having a threaded inlet port 14, a center core section 20 having a plurality of output ports, such as ports 21 and 22 visible in this figure, and a base section 50 having a threaded exhaust port 56 on its underside, and a mounting base 52. These three sections are preferably constructed of transparent plastic of suitable thickness and composition, which sections are held together by the use of screw threads. Preferably female threads are provided on the upper and lower sections, with male threads 46 being disposed on the upper end of the center section 20, and male threads 48 being located on the lower end.

Some alternate means of compressing the valve units or sections together can be used, as will be discussed hereinafter. These means can include a combination of threaded rods, thumb screws, and "O" ring seals, as will be noted from FIG. 12, and may also include a "Mason Jar" type of closure consisting of a threaded metal ring and rubber seal snugging a properly shaped upper air chamber section to the center core section effecting an air tight seal; note FIG. 13. Because of these various types of construction, it is important to realize that the sections utilized in accordance with this invention may be readily and advantageously separated without the use of any tools, in the event the replacement of a section becomes necessary.

Although I prefer for the inlet air chamber 12 to be at the top of my device, and the base section 50 at the bottom, I am not to be restricted to this type of construction.

Figure 2:
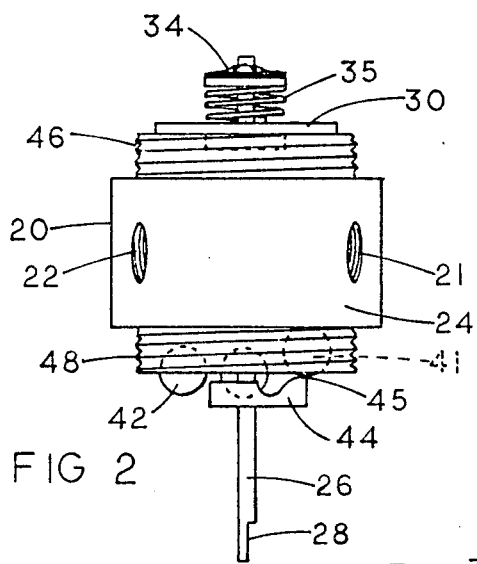
FIG. 2 is a view to a somewhat larger scale, the center section of my novel valve, in which a portion of the rotatable center shaft is revealed.
Figure 2C:
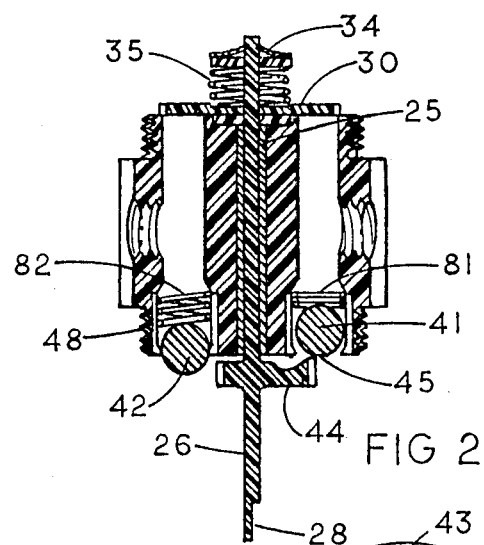
FIG. 2C is a cross-sectional view of the center section, taken along lines 2C—2C in FIG. 2A to reveal the manner in which the shaft is mounted for rotation in the center section, and revealing certain aspects of the operational relationship involving the cam member and the several ball valves.
Figure 2A:
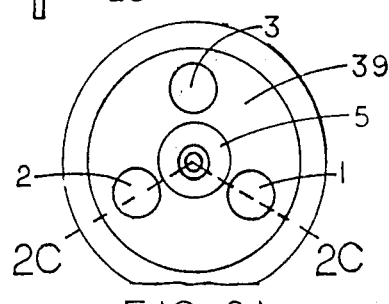
FIG. 2A is a top view of the upper portion of the center section, in which three passages, disposed in equally spaced relation about the center shaft, are revealed.

The center core section 20 contains a plurality of parallel passages, these being passages 1, 2 and 3 best seen in FIG. 2A. In the lower ends of these three passages are ball check valves, involving spring biased balls 41, 42 and 43, respectively, each of which interacts with a suitable valve seat. Thus, most of the operative hardware of my device is to be found in the center core section 20, and it should be pointed out that in the event of malfunction, the sections can be unscrewed or disassembled, as earlier mentioned, and a new center core section immediately substituted between the upper and lower sections. The removed center section can then be discarded, for it is designed to be disposable. Thus, the turn-around time is minimal, and no services by a skilled repair man are needed.

Figure 1A:
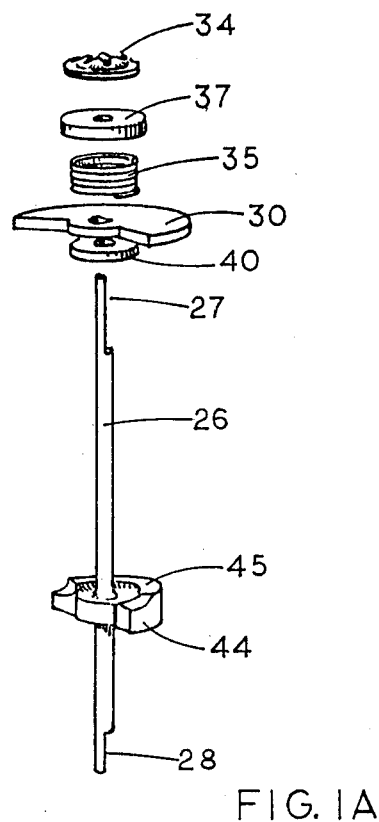
FIG. 1A represents an exploded view of the shaft that is mounted for rotation in the center section of the device depicted in FIG. 1.

With reference to FIGS. 1A, 2 and 2C, it will be seen that I have provided a rotary shaft 26 journaled in the center core section 20 and extending entirely therethrough, with a suitable connection provided at each end. Typically I construct the shaft 26 to have partially flattened ends, with partially flattened end 27 at the upper end of shaft 26 being designed to fit closely into a like shaped hole in a sector member 30, which sector member is of particular consequence to this invention. Because the hole in the rotatable sector member 30 is non-circular, there can be one and only one relationship existing between the shaft 26 and the rotary sector member 30. The partially flattened lower end 28 of the shaft 26 facilitates a proper, driving attachment to a drive motor, not illustrated. The shaft 26 is journaled in a bronze bushing 25, visible in FIG. 2C, and for example, the shaft can have a diameter of ⅜ inch, but obviously I am not to be limited to this. As will be understood, the lower end of the shaft 26 extends sufficiently far below the center core section 20 as to protrude through a center hole located in the lower section 50, which facilitates an effective coupling to the drive motor (not shown), located below section 50.

FIG. 1A reveals in connection with shaft 26 a clip fastener 34 of spring steel, a spring retainer 37, a compression spring 35, and the rotatably mounted sector member 30. Below the sector member is a Teflon seal 40, designed to reside in the recess 5 located in the center of the flat surface 39 atop the center section 20, visible in FIG. 1. It will be understood that the non-symmetrically shaped upper portion 27 of the shaft 26 is configured, as best seen in FIG. 1A, to be closely received in the non-circular hole in sector member 30. The partially flattened upper portion 27 extends down far enough on the shaft as to permit the sector 30 to reside in a proper operative relationship to the flat surface 39, and perform a valving function therewith. The clip fastener 34 of spring steel fits tightly enough on the upper end of shaft 26 as to enable the spring 35 to be retained in a desirable condition of compression.

A rotary cam member 44 designed to sequentially operate the spring biased balls 41, 42 and 43 is affixed on the shaft 26 in a specific, preascertained relationship to the partially flattened upper end 27 of the shaft 26. In this way, the sector member 30 and the cam member 44 always rotate in a specific, preascertained relationship, with there being no possibility of the occurrence of rotational slippage between these two members. A high point 45 is provided on rotary cam 44 such that in the correct relationship to sector 30, one single ball at a time is moved off its seat; note FIGS. 2 and 2C, wherein ball 41 has been moved against the bias of compression spring 81 away from its seat. In this instance, ball valve 41 is in an "open" condition. The aforementioned spring 35 adjacent the sector member 30 assures the high spot 45 of the cam 44 residing at all times in the desired heightwise relationship to the balls 41, 42 and 43.

With regard to the previously mentioned motor, I prefer to utilize a remotely mounted, low RPM, AC electric hysteresis synchronous instrument drive motor, coupled to the shaft 26 of my novel rotary valve by means of a quick disconnect coupling. Coupling of the shaft to the drive motor is accomplished by just plugging the partially flattened or "shaped" end 28 of the drive shaft 26 into a drive motor quick disconnect coupling. The significance of this arrangement is that it results in a most versatile rotary valve, which can be used in any reasonable size (capacity) machine without modification or adjustment of any kind, thereby rendering it, for the first time, the one truly "universal" standardized part available for all reasonable size (capacity) home use oxygen concentration machines.

The drive motor selected RPM is determined by the design output of the particular oxygen concentrator in which it is installed. Duration of the pressure/purge cycle of a particular machine is dependent on the physical size of the sieve beds involved verses the volume of airflow to which they are subjected during a fixed period of time.

A typical overall arrangement in accordance with my invention is illustrated in FIG. 3, and as an example, a trio of sieve beds 61, 62 and 63 is depicted. Each sieve bed for example measures 24 inches in length, and one cycle of pressurization and then of purging might for example require 20 seconds each, for a total cycle of 60 seconds. Therefore, a drive motor geared to rotate at 1 RPM would be appropriate. As another example, a trio of sieve beds each measuring only 12 inches in length might require only half the time, or 10 seconds each for pressurization and then purging, for a total of 30 seconds to accomplish the complete cycle. In this latter instance, a drive motor geared to rotate at 2 RPM would be required.

The foregoing are very clearly to be regarded as examples only, because as previously stated, pressurization/purge cycle duration is totally dependent on physical size/air column/time frame, variables which by necessity would dictate a drive motor geared to have the appropriate corresponding RPM.

As will be noted from drawing FIGS. 1 and 3, mounting holes 54 in the mounting base 52 of the lower or base section facilitate the physical attachment of the rotary valve to an oxygen concentration machine proper.

Disposed in the center core section 20 of the preferred embodiment of my valve 10 are, as previously mentioned, three vertical passages 1, 2 and 3, disposed 120° apart, at locations equidistant from the center shaft 26, these best being seen in FIG. 2A. The somewhat simplified showing illustrated in FIG. 4 reveals that the upper ends of the passages 1, 2 and 3 are coplanar, that is, a flat surface 39 is formed at upper ends of these passages, to permit a first type of valve action to take place. Preferably this valve action is a result of the employment of the aforementioned rotating sector member 30 mounted adjacent the upper end of rotating shaft 26, and downwardly biased by a spring 35. The sector member 30 has open and closed portions, and is operative in a manner shortly to be described. Passages 1, 2 and 3 whose upper ends are at a given time in contact with the closed portion of the sector member 30 may at such time be considered closed.

The preferred form of the first valve means is a sector member 30 that represents an angular extent of 230°, which of course means that the opening it presents is an angular valve of 130°; see FIGS. 4, 5 and 6 in this regard. This angular extent is not appropriate in every instance, however, so I prefer to refer to the closed portion as being of an angular extent somewhat less than 240°. Quite obviously I am not to be limited to any particular angular extent, nor to any particular valve opening associated with sector member 30.

As the shaft 26 is caused by the motor to rotate, the sector member 30 is caused to rotate, and to perform a highly desirable form of valving action with respect to the flat valving surface 39, at which surface the coplanar upper ends of the several parallel passages terminate. As best seen from FIG. 4, this rotating sector member 30 has a leading edge 36, and a trailing edge 38. The air pressure in the air chamber section 12 serves to help the spring 35 bias the rotating sector member 30 into a no-leak relationship with the coplanar passage ends.

With reference to FIGS. 1 and 2, threaded holes are provided through the sidewall 24 of the center section 20, with the number of such holes corresponding to the number of parallel passages utilized in the center section. Threaded hole 21 is placed so as to intercept passage 1, and threaded hole 22 is placed so as to intercept passage 2, with a third threaded hole, not shown, intercepting passage 3.

As seen in FIG. 3, into threaded hole 21 may be threadably received a fitting 31, to which fitting a tube or pipe 71 is connected, so that the respective molecular sieve bed 61 can receive air in an alternating manner hereinafter described. Similarly, a fitting 32 is screwed into threaded hole 22, serving to connect tube or pipe 72, that in turn connects to molecular sieve bed 62.

Fitting 15, concerned with the supply of compressed air to the interior of air chamber 12, is screwed into threaded inlet port 14.

Preferably, in keeping with the quick disconnect concept of my novel valve, the most advantageous fittings are NPT to male quick disconnect hose coupler fittings. However, for some applications, NPT to hose barb fittings are also acceptable.

Continuing with FIG. 3, a third tube or pipe, tube or pipe 73, connects to the unseen threaded hole in the center section 20 to molecular sieve bed 63. The upper ends of the molecular sieve beds are connected to suitable manifolding 60 containing several one way check valves and restrictor fittings, concerned with the delivery of oxygen in a non-pulsating manner through delivery tube 90 to a point of use, and this will be discussed hereinafter.

Figure 2B:
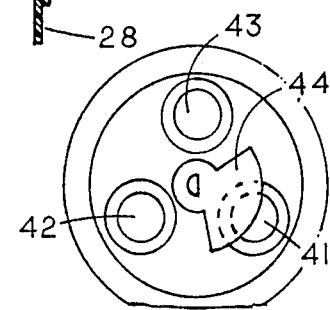
FIG. 2B is a bottom view of the center section, with the shaft mounted cam member being clearly revealed.

In the ends of the passages 1, 2 and 3 remote from the rotary sector member 30 are disposed appropriate valving means. Such valving means takes the form of the previously-mentioned ball valves 41, 42 and 43 visible in FIGS. 1, 2 and 2C, which the preferred embodiment, the lower ends of passages 1, 2 and 3 are constricted to a suitable degree to form seats for the balls, and the ball valves 41, 42 and 43 are utilized in conjunction with the previously described cam member 44, which is regarded as the a valve operating member. The spheres or balls of these valves are biased by compression springs or the like into close fitting contact with valve seats provided in the respective passages; note FIG. 2C, wherein spring 81 biases ball 41 downwardly, and spring 82 biases ball 42 downwardly. Thus, the ball valves 41, 42 and 43 are normally closed, except when each ball is caused to move off its respective seat by contact with the high point 45 of the valve operating member 44. In FIGS. 2B and 2C it can be seen that cam member 44 interacts sequentially in a fully operative manner with each of the balls of the ball valves.

It was previously explained that the cam member 44 is affixed to shaft 26, so as to rotate therewith. The shaft 26 is biased upwardly by the compression spring 35, situated adjacent the top of shaft 26, and acting against the spring steel clip fastener 34. Therefore, the rotation of the cam member 44 brings about the temporary or momentary contact of the high point 45 with the balls of the valves 41, 42 and 43 in a sequential manner, and thus brings about an alternate opening and closing of these valves in a carefully timed relation. As best seen in FIG. 2B, the cam member 44 in this case is configured so as to represent an angular extent less than 120°, which means that just as one ball is being caused to move up to the open position, another ball has just been permitted to move back down to the seated position, so as to have only one ball valve open at a time; see FIG. 7.

It is important to note that I prefer to round the leading and trailing edges of the cam member 44, as best seen in FIG. 1A. In this way the cam member is enabled to smoothly control the opening and the re-seating of the ball valves 41, 42 and 43. Under certain conditions, depending on variables such as the physical shape of the molecular sieve bed tanks, composition of the non-organic "molecular sieve" material, design and function of the interconnect manifold and other unusual or unforeseen factors, it can be advantageous from the standpoint of machine design to configure the cam member 44 so as to present an angular extent approaching 180°, such that it can open more than one ball valve for a limited time frame, resulting in some purge cycle overlap. Obviously I ordinarily prefer to utilize a cam member presenting an angular extent of less than 120°, but am not limited to any one particular angular relationship.

Because of the importance of the relationship, I wish to emphasize that the cam member 44 is in phase with the closed portion of the sector member 30, such that at a given moment, either the upper end or the lower end of each passage 1, 2 or 3 is open, but never are both ends open at the same time.

My device is quite effective to bring about the alternate pressurizing and purging of the molecular sieve beds 61, 62 and 63, in a highly advantageous manner, which will shortly be described in greater detail.

At this point it should be restated that the molecular sieve beds 61, 62 and 63 are each loaded with a granular material which has an affinity for nitrogen and other gases, but which freely passes oxygen for a brief period of time if subjected to high volume of pressurized air. Therefore, if compressed air is applied to the bottom of a sieve bed, highly enriched oxygenated air comes out of the top, but this may, for example, be for a duration of only about 20 seconds. Again, this duration is dependent on sieve bed tank capacity vs. volume of compressed air vs. time frame variables. The sieve bed oxygen, so at this point the saturated sieve bed must be "recharged."

It is well known that in order to recharge a saturated sieve bed, it must be flushed or purged with oxygenated air. Purging in this invention is done in a reverse direction down through each sieve bed tank, with oxygenated air obtained from the manifold 60, out through the same hose fitting through which it was originally pressurized. It then passes to the exhaust or purge side of the instant continuous Rotary Pressure/Purge Valve, and is vented to the atmosphere through the exhaust port of the valve 56.

The use of molecular sieve material in the above-mentioned manner is described in U.S. Pat. Nos. 2,944,627; 3,280,536; 3,142,547 and 3,948,286. Inasmuch as the use of such molecular sieve materials is thus known in the patent literature, it is not necessary for me here to provide a description of such materials nor their use in tanks of the present type.

With reference back to FIG. 3, it will be recalled that the preferred embodiment of a valve 10 in accordance with this invention is supplied with air under pressure from a compressor, not illustrated herein. The compressor is preferably electrically powered, and it is designed to supply a relatively high volume of air to the valve 10 at a comparatively low pressure. This air is provided to the aforementioned air inlet fitting 15 disposed upon an upper part of the compressed air receiving chamber 12. From the upper air chamber the air can of course flow through whichever of passages 1, 2 and 3 whose upper ends at a given moment are not occluded by a closed portion of the sector valve member 30. Generally, based on sieve bed capacity, the pressure in upper air chamber 12 is typically 10 psig to 20 psig. This pressure is approximately the pressure range at which the molecular sieve beds optimally operate.

It will be recalled that the pressure in the upper air chamber 12 was mentioned as serving an ancillary purpose of aiding the spring 35 in causing the rotating sector member 30 to make proper valving contact with the flat upper surface 39 at which coplanar upper ends of the passages 1, 2 and 3 terminate. As a result, little if any leakage into the passages occluded by the closed portion of the sector member will take place. As will be understood, if passage 1 is at a given moment open, air will flow therefrom through tube or hose 71 to the underside of molecular sieve bed 61, to cause it to supply oxygen through the manifolding 60 shown in FIG. 3, to the oxygen delivery tube 90. At this same time, another of the molecular sieve beds is being purged for prompt reuse. As will be understood, continued rotation of the shaft 26 at a pre-established rate in turn causes compressed air to be successively delivered to molecular sieve beds 61, 62 and 63 in a recurring manner.

Figure 11:
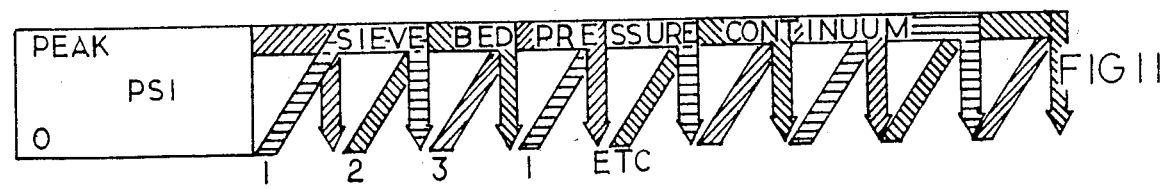
FIG. 11 is similar to FIG. 10, but here depicting the "sieve bed pressure continuum" advantageously created by the instant valve as each sieve bed is held at peak pressure while each succeeding sieve bed is brought up to peak pressure by the unique valving action of the instant rotary valve.

The advantageous configuration of the sector disk 30 of my novel valve, in concert with a unique interconnect manifold, makes my invention ideal for pressurizing more than one molecular sieve bed at a time. At any one moment during the rotation of the sector disk, at least one sieve bed is always fully pressurized. The next sieve bed in rotational sequence is subjected to pressure in such a manner, during a specific time frame, so as to effectively produce an overlap of constant pressure to the manifold delivery tube 90. This advantageous result is not obtained by the use of the type of valving used for example in the Snyder U.S. Pat. No. 4,272,265. As Snyder reveals in FIG. 11 of that patent, each sieve bed in his system is pressurized individually in an isolated manner, with no pressurization overlap, resulting in abrupt individual pulses of oxygenated product being impressed on his manifold. This characteristic is to be seen in FIGS. 8 and 9 herein, which have been captioned Prior Art. The Snyder modus operandi is in stark contrast with the smooth continuous flow achieved by the instant invention, as depicted in FIGS. 10 and 11 of this case.

It is believed that the operation of my device to bring about the alternate charging and purging of the molecular sieve beds will be clearer if a comparison is made of generally similar FIGS. 4, 5 and 6, and their related FIGS. 4A, 5A and 6A.

FIG. 4 is a simplified showing of the upper portion of the center core section 20, and in this figure it will be noted that the leading edge 36 of the sector member 30 is adjacent the passage 1, whereas the trailing edge 38 is across the center of passage 2. This of course means that compressed air is being caused to flow from the pump to the air inlet chamber 12, then through passage 1 and thence through fitting 31 and tube 71 to the underside of the sieve bed 61, to accomplish a pressurization thereof. Additionally, as the sector valve 30 rotates and continues to expose passage 2 to pressure, air is permitted to flow to fitting 32 and tube 72 to the underside of molecular sieve bed 62, thus fully pressurizing molecular sieve bed 62 before the advancing leading edge 36 of the sector member cuts off pressurization to passage 1 and associated molecular sieve bed 61. This advantageous interaction of the rotating sector member 30 relative to passages 1, 2, and 3 each in turn, is what is responsible for producing the constant pressure overlap feature that characterizes my novel valve, thereby completely eliminating the need for an oxygen storage tank to smooth out pulsations.

It is to be understood that contemporaneous with the air flowing in the charging direction through the tubes or hoses 71 and 72, the purging air flows from molecular sieve bed 63 through tube or hose 73 back to the lower chamber of the value 10, which purging air is typically dumped overboard through exhaust port 56 located on the underside of the lower member 50.

Now in more detail, whereas the sector member 30 maintains the upper end of passage 3 in a closed condition in the particular instance depicted in FIG. 4, the cam member 44 at this time is in a position to contact the ball 43 of the second valve means; note simplified FIG. 4A. This has the effect of opening the lower end of passage 3, thus to permit air to flow from tube 73 connected to the underside of molecular sieve bed 63 to the valve 10, and more particularly, to passage 3 of valve 10. Because the lower end of this passage was opened by the cam member 44, this purging air can flow out of the exhaust port 56 on the underside of the valve 10. As previously indicated, the air inlet and the rotating sector member could be placed at the lower end of my device, and the ball valves and purged air outlet at the top, but this construction is not preferred.

In a somewhat similar manner, in simplified FIG. 5 I have shown the leading edge 36 of sector member 30 disposed in a position adjacent the upper end of passage 2, with the trailing edge 38 of the sector member disposed half way across the upper end of passage 3. As will be understood from the previous explanation, this condition brings about pressurization of molecular sieve bed 62, and an initial pressurization of molecular sieve bed 63. Because the sector 30 at this particular point occludes the upper end of passage 1, no air from the compressor can flow into this passage. However, inasmuch as simplified FIG. 5A reveals that the cam 44 is in contact with the ball 41, purging air can flow from molecular sieve bed 61 back through tubing or hose 71 to the lower chamber of the valve, and thence to the atmosphere through exhaust port 56.

FIG. 6 depicts the subsequent sequential relationship with respect to passage 3. In the same manner as before, the previously mentioned components of the valve continue to operate so as to bring about a relationship between the passages, the rotating sector member 30, cam member, ball valves, such that molecular sieve bed 63 is charged, and sieve bed 61 is initially pressurized, sometimes also referred to as initial charging.

Figure 7:
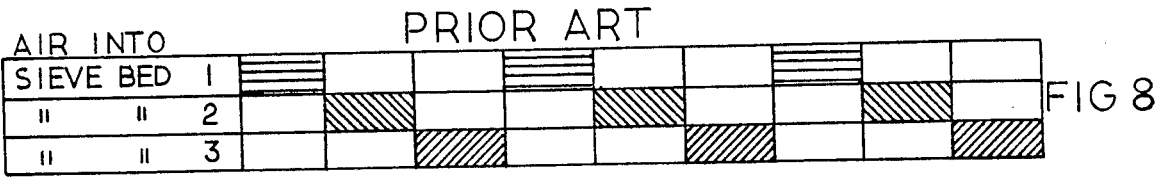
FIG. 7 is a diagrammatic representation of the relative positions of the sector member, the cam member, and the ball valves through approximately 120 degrees of arc movement clockwise.

FIG. 7 is a diagrammatic representation of the relative positions of the sector member, the cam member, and the ball valves through approximately 120 degrees of arc movement clockwise from the passage located at the twelve o'clock position, toward the passage located at the four o'clock position. Though not here depicted, it is to be understood that similar corresponding relationships occur as the sector member and cam member rotate a full 360 degrees through the four o'clock position and then through the eight o'clock position, with corresponding ball valve action appropriate to each passage occurring in concert with sector and cam member operation.

Figure 8:
FIG. 8 is a representation of a portion of the bar graph, FIG. 11, of the Snyder U.S. Pat. No. 4,272,265, here concerned with showing the manner in which each sieve bed is separately and independently pressurized, resulting in a series of pulses of oxygen being produced as each sieve bed is brought from atmospheric pressure to peak (operating) psi.

FIG. 8, captioned Prior Art, is a representation of the bar graph revealed in FIG. 11 of the device set forth in the Snyder U.S. Pat. No. 4,272,265, concentrating specifically on the pressurization cycles and the manner in which each sieve bed is separately and independently pressurized, resulting in a series of pulses of oxygen being produced as each sieve bed is brought from zero psi (atmospheric) to peak (operating) psi. The purge cycles as depicted in FIG. 11 of Snyder's patent are not included in this graph as they are not considered germane to the comparison of the pressurization cycles of prior art devices verses the instant valve.

Figure 9:
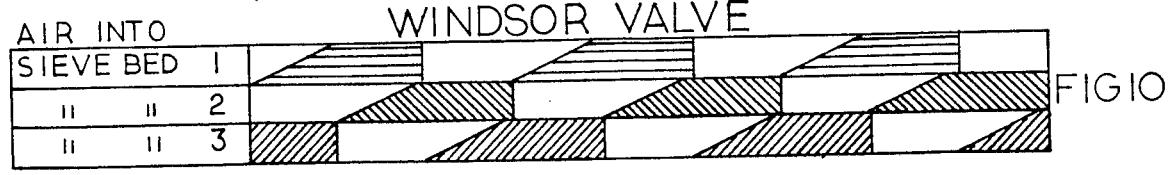
FIG. 9 is a graph containing the same information as depicted in FIG. 8, but here the pressurization cycles are shown in the manner of a vertical line graph, with air pressurization shown on the left as zero psi (atmospheric) at the bottom of the graph and peak (operating) psi at the top of the graph.

FIG. 9 contains the same information as depicted in FIG. 8, but presents it in a slightly different manner. The pressurization cycles are shown in the manner of a vertical line graph with air pressurization shown on the left as zero psi (atmospheric) at the bottom of the graph and peak (operating) psi at the top of the graph. Passage of time is represented by moving from left to right across the graph surface. As shown, the Snyder device, as well as all other prior art devices, produces a series of pressure pulses from zero psi to peak psi as each sieve bed is independently pressurized and eventually purged.

FIG. 10 of this case makes possible a comparison of the operation of the instant valve with the operation of prior art devices depicted in FIG. 8 herein. It is important to note that the sieve beds are independently and separately pressurized in FIG. 10, but because of the unusual valving action accomplished herein by the novel interaction of the sector member, cam member, and ball valves, in conjunction with an interconnect manifold, a unique pressure overlap is produced, creating in effect a "sieve bed pressure continuum" and effectively eliminating pressurization pulses at the product outlet, thereby eliminating the requirement for interim product storage so necessary for prior art devices.

FIG. 11 contains the same information as depicted in FIG. 10, and is here presented in the same type of manner as FIG. 9 was related to FIG. 8. It is significant to note that the "sieve bed pressure continuum" is created by the instant valve as each sieve bed is held at peak pressure, while each (next) succeeding sieve bed is brought up to peak pressure by the unique valving action of the instant rotary valve.

Figure 12:
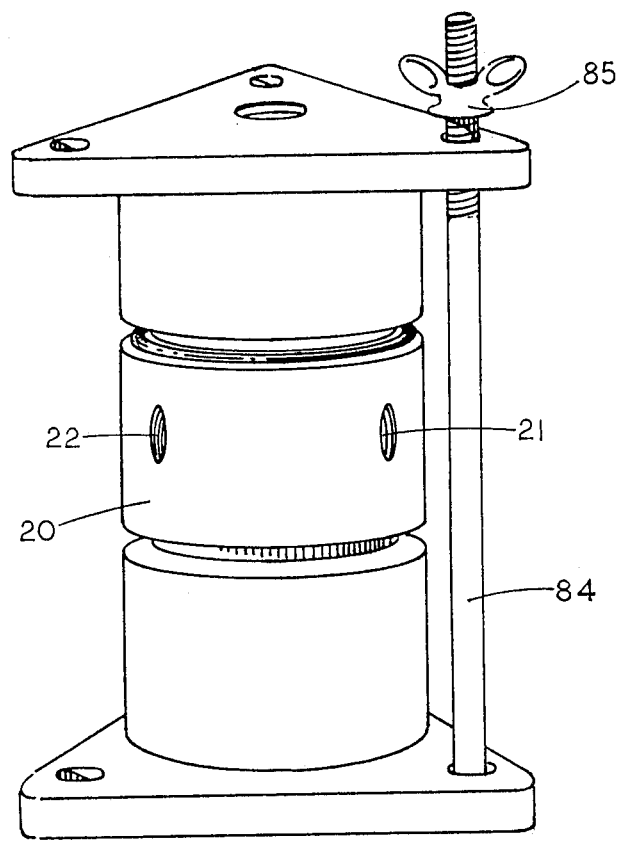
FIG. 12 is a perspective view of an alternate embodiment of my invention, in which the major components are held together by three or more threaded rods fitted through matched upper and lower plates.

FIG. 12 is a perspective view of an alternate embodiment of my invention in which the major components are held together by three or more threaded rods 84 fitted through appropriate holes in matched upper and lower plates, and tightened by the use of wing nuts 85. As previously mentioned, either the air inlet section or the base section can be located above the center core section 20, although I usually prefer to have the air inlet section 12 located above the center core section.

Figure 13:
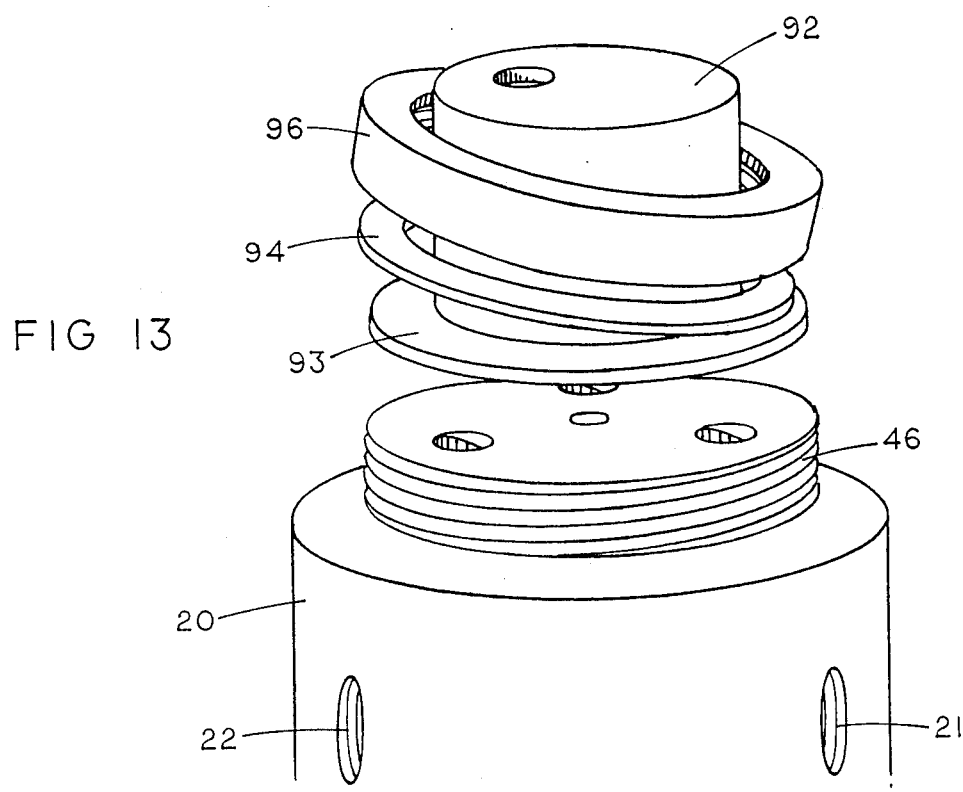
FIG. 13 is a view of another alternate embodiment, in which the major components of the top portion of my valve are held together by a "Mason Jar" type of assembly, consisting of an appropriately shaped air chamber, a metal or plastic threaded ring, and a rubber or plastic "O" ring or seal.

FIG. 13 is a view of another alternate embodiment, in which the major components are held together by a "Mason Jar" type of assembly comprising an appropriately shaped air chamber 92 having a lower flange or shoulder 93. A rubber or plastic "O" ring or seal 94 rests upon the shoulder 93, with sealing being assured at such time as the internally threaded ring 96 is tightened upon the male threads 46 of the center core section. In this embodiment of my valve, only the top portion is illustrated, for a tight air seal need exist only between the inlet air chamber and the center core section 20. Since the base section of my valve in all cases is vented to the atmosphere for the purpose of eliminating purged gases, a wide range of functional and appropriate attachment means thereto are acceptable.

It is to be realized that the interconnect manifold 60 illustrated in FIG. 3 is not an integral component of the instant rotary valve. Its function is nevertheless important to the efficient routing and distribution of the gaseous flow within an oxygen concentration machine. The unique combination and arrangement of one way check valves and 1/16th of an inch orificed line restrictors I prefer to use function in such a way as to force the gaseous oxygen product present within the interconnect manifold to move in a circular direction within the manifold. This movement is such as to result in approximately 10 percent of the oxygen product being delivered to the product outlet 90 for patient consumption, with the remaining approximately 90 percent of the oxygen product being directed to the particular sieve bed undergoing back flushing or purging in order to "re-oxygenate" or prepare the sieve bed for its next pressurization cycle.

The one way check valves, 101, 102, and 103, serve to force the oxygen enriched gas to flow in a circular direction within the manifold, and to close and isolate a portion of the manifold during purge cycles. In addition, three one way check valves, 104, 105, and 106, allow some oxygen product access to the delivery tube 90, but do not allow return flow, nor permit ambient air to enter and contaminate or dilute the system.

The orificed line restrictors 111, 112, and 113, perform two related functions within the interconnect manifold as it is exercised through its continuous circular pressurization and purging cycles. First, in conjunction with the one way check valves, the restrictors cause a low pressure area (in relation to the pressurized portion of the manifold) to be formed on the purge side of the orifice opening remote from the pressurized side of the orifice. This low pressure-high pressure relationship causes a corresponding check valve to seat and therefore direct the oxygen product in the desired direction, that is, to the delivery tube 90, or to the sieve bed undergoing a purge cycle.

In addition, the orificed line restrictors "meter" or regulate the oxygen enriched air flow back down through the purging sieve bed in a relatively slow controlled manner, thereby preventing the total pressure present in the interconnect manifold from being instantly dumped overboard. This orifice controlled purging enables the air compressor to maintain a constant positive pressure on the interconnect manifold and to keep up with the pressure being "lost" as a result of product delivery to delivery tube 90 and the pressure lost as a result of continually purging what might be regarded as the "third" sieve bed in any 120 degree rotational cycle.

Unlike prior art oxygen concentration machines which require a service organization to stockpile a large number component parts, the present invention is, so to speak, universal in that no great storage facility is required in order to make these machines continuously operational. This is because my novel Rotary Pressure/Purge Valve renders these machines substantially identical, with one machine being able to use the same exact parts as another. In order for the user to utilize my valve with large sieve beds, one particular RPM motor is used, whereas with sieve beds of a different size or capacity, the user needs only to switch to a motor geared to provide a different RPM, while being able to use the same exact machine otherwise.

I claim:

1. In a rotary pressure/purge valve for supplying pulsation-free oxygen without the use of an oxygen tank, said valve comprising an air chamber section and a center section, utilized in conjunction with a source of purging air, said air chamber section having an inlet port for compressed air, said center section having a plurality of passages therein, disposed at equal intervals from each other and with respect to a centerline common to both sections, said center section and therefore said passages having first and second ends, first valve means operatively associated with said first passage ends, and serving to control the entry of charging air into two adjacent passages at the same time, and second valve means operatively associated with said second ends of said passages and serving to control the exit of purging air from said passages, said center section having a separate output port connecting to each of said passages, a shaft rotatably journaled on the centerline of said center section, with said shaft being connected to rotation producing means, said first valve means and said second valve means each having a portion that is operated by said shaft, with said first and second valve means being set out of phase such that when a first end of a given passage is closed to the entry of charging air, the other end of that passage is open to a flow of purging air, and vice versa, whereby at a given moment compressed air can flow in one direction through at least one of said first valve means and an associated passage, contemporaneously with purging air flowing in a different direction through a different one of said passages.

2. In a disposable type rotary pressure/purge valve for supplying pulsation-free oxygen without the use of an oxygen tank, said valve comprising an air chamber section, a center section, and a source of purging air, said air chamber section having an inlet port for compressed air, said center section having a plurality of parallel passages therein, disposed at equal intervals from each other and with respect to a centerline common to both sections, said center section and therefore said passages having first and second ends, first valve means operatively associated with said first passage ends, and serving to control the entry of charging air into two adjacent passages at the same time, and second valve means operatively associated with said second ends of said passages and serving to control the exit of purging air from said passages, said center section having a sidewall in which output ports are disposed, with each output port connecting to a respective one of said passages, a shaft rotatably journaled on the centerline of said center section, with one end of said shaft being connected to rotation producing means, said first valve means and said second valve means each having a portion that is operated by said shaft, with said first and second valve means being set out of phase such that when a first end of a given passage is closed to the entry of charging air, the other end of that passage is open to a flow of purging air, and vice versa, whereby at a given moment compressed air can flow in one direction through at least one of said first valve means and an associated passage, contemporaneously with purging air flowing in a different direction through a different one of said passages.

3. The disposable type pressure/purge valve as recited in claim 2 in which said first valve means and said second valve means are arranged in an opposed relationship such that when full pressure charging air is flowing through one of said passages, initial pressure air is flowing through a second passage, and purging air is flowing in an opposite direction through a third passage, each in turn and in sequence as said first and second valve means each continue to rotate through each complete 360° cycle.

4. The disposable type rotary pressure/purge valve as recited in claim 2 in which said first valve means is a sector member, said sector member being continuously exposed to the full pressure of the compressed air in said air receiving section, the pressure of the compressed air serving to keep said sector member in a close-fitting relationship with said first passage ends, to assure against undesirable leakage.

5. The disposable type rotary pressure/purge valve as recited in claim 2 in which said first valve means is a sector member having an open portion of an angular extent greater than 120°, and a closed portion of an angular extent less than 240°.

6. The disposable type rotary pressure/purge valve as recited in claim 2 in which said second valve means is represented by a plurality of ball valves utilized in conjunction with a rotary cam member, with the ball of each valve being normally biased into sealing relation with its respective seat, and said cam member being disposed in operative relation with respect to said balls, such that as said cam member is caused by said shaft to rotate, each of said balls is successively moved to an open condition, after which each ball is permitted to close under the influence of its bias.

7. In a disposable type rotary pressure/purge valve for supplying pulsation free oxygen without the use of an oxygen tank, said valve comprising an air chamber section, a center section and a base section, said air chamber section having an inlet port for compressed air, said center section having a plurality of parallel passages therein, disposed at equal intervals from each other and with respect to a centerline common to all three sections, said passages having one set of ends terminating in a common plane, said base section having an exhaust port for purging air, first valve means operatively associated with said coplanar passage ends, and serving to control the entry of charging air into two adjacent passages at the same time, and second valve means associated with the other ends of said passages and serving to control the exit of purging air from said passages, said center section having a sidewall in which output ports are disposed at essentially equal intervals, with each output port connecting to a respective one of said passages, a shaft rotatably journaled on the centerline of said center section, with one end of said shaft being connected to motor means, said first valve means and said second valve means each having a portion that is operated by the rotation of said shaft, with said first and second valve means being set out of phase such that when a first end of a given passage is closed to the entry of charging air, the other end of that passage is open to the flow of purging air, and vice versa, whereby compressed air can flow in one direction through at least one of said first valve means and an associated passage at a given moment, with purging air contemporaneously flowing in a different direction through a different one of said passages.

8. The disposable type rotary pressure/purge valve as recited in claim 7 in which said first and second valve means are set in opposition in such a manner that when full pressure charging air is flowing through a first of said passages, initial pressurization air is flowing through a second passage, and purging air is flowing in an opposite direction through a third passage, each in turn and in sequence, as both of said first and second valve means continue to rotate through each 360° cycle.

9. The disposable type rotary pressure/purge valve as recited in claim 7 in which said first valve means is a sector member having an open portion of an angular extent greater than 120°, and a closed portion of an angular extent less than 240°.

10. The disposable type rotary pressure/purge valve as recited in claim 7 in which said second valve means is represented by a plurality of ball valves utilized in conjunction with a rotary cam member, with the ball of each valve being normally biased into sealing relation with its respective seat, and said cam member being disposed in operative relation with respect to said balls, such that as said cam member is caused by said shaft to rotate, each of said balls is successively moved to an open condition, after which each ball is permitted to close under the influence of its bias.

11. The disposable type rotary pressure/purge valve as recited in claim 7 in which said first valve means is a sector member having an open portion of an angular extent more than 120°, and a closed portion of an angular extent less than 240°, and said second valve means is represented by a plurality of ball valves utilized in conjunction with a rotary cam member, with the ball of each valve being normally biased into sealing relation with its respective seat, said rotary cam member being disposed in operative relation with respect to said balls, such that as said cam member is caused by said shaft to rotate, each of said balls is successively moved to an open condition for a predetermined length of time, said sector member and said cam member being arranged in an opposed relationship such that when full pressure charging air is flowing through one of said passages, initial pressurizing air is flowing through a second passage, and purging air is flowing in an opposite direction through a third passage, each in turn and in sequence as said sector member and said cam member each continue to rotate through each complete 360° cycle.

12. The disposable type rotary pressure/purge valve as recited in claim 11 in which said sector member is continuously exposed to the full pressure of the compressed air in said air receiving section, the pressure of the compressed air serving to keep said sector member in a close-fitting relationship with said coplanar passage ends, to assure against undesirable leakage.

13. In a rotary pressure/purge valve for supplying pulsation free oxygen without the use of an oxygen tank, said valve comprising an air chamber section, a center core section and a base section, said air chamber section having an inlet port for compressed air, said center core section having a plurality of parallel passages therein, disposed at equal intervals from each other and with respect to a centerline common to all three sections, said passages having one set of ends that are coplanar, said center section also having a sidewall in which output ports are disposed at equal intervals, with each output port connecting to a respective one of said passages, said base section having an exhaust port for purging air, a shaft rotatably journaled on the centerline of said center section, motor means connected to said shaft, to selectively drive it in rotation, a ball valve being disposed at the end of each of said passages, at locations remote from said coplanar ends, with each ball normally being biased into contact with its seat so as to effect closure of that end of its passage, a rotary sector member disposed adjacent the coplanar ends of said passages that are remote from said ball valves, said sector member having an open portion and a closed portion, said sector member being connected so as to be driven in rotation by said shaft, said sector member serving a valving function with respect to said coplanar passage ends in that those passage ends are closed to the entry of compressed air when the closed portion of said sector member extends thereover, and a rotary cam member mounted to be driven in rotation by said shaft, and located immediately adjacent said ball valves, said rotary cam member being configured to successively intercept each ball as said shaft rotates, with a high point on said rotary cam member causing an intercepted ball to move off its seat for a predetermined length of time and therefore open the end of a passage remote from said sector member for the flow of purging air, said rotary cam member being in a predetermined phase with the closed portion of said sector member such that at a given moment, either one or the other end of each passage is open, but never both ends open at the same time.

14. The rotary pressure/purge valve as recited in claim 13 in which said center section contains three parallel passages, said sector member and said rotary cam member being arranged in an opposed relationship, such that when full pressure charging air is flowing through one of said passages, initial pressure air is flowing through a second passage, and purging air is flowing in an opposite direction through a third passage, each in turn and in sequence as said sector member and said cam member each continue to rotate through each complete 360° cycle.

15. The rotary pressure/purge valve as recited in claim 13 in which said sector member is continuously exposed to the full pressure of the compressed air in said air receiving section, the pressure of the compressed air serving to keep said sector member in a close-fitting relationship with said coplanar passage ends, to assure against undesirable leakage, said sector member and said cam member being arranged in an opposed relationship, such that when full pressure charging air is flowing through one of said passages, initial pressure air is flowing through a second passage, and purging air is flowing in an opposite direction through a third passage, each in turn and in sequence as said sector member and said cam member each continue to rotate through each complete 360° cycle.

16. The rotary pressure/purge valve as recited in claim 13 in which said sections are constructed of transparent plastic, with adjacent sections being secured together by the use of screw threads.

17. The rotary pressure/purge valve as recited in claim 13 in which said sector member has an open portion of an angular extent greater than 120°, and a closed portion of an angular extent less than 240°.

18. The rotary pressure/purge valve as recited in claim 13 in which after the ball of each ball valve has been placed in an open condition by said rotary cam member, each ball is thereafter caused by its respective bias to return to its seat as said rotary cam member passes on by.

19. A rotary pressure/purge valve comprising an air receiving section, a center section and a base section, said air receiving section having an inlet port for the entry of compressed air, said center section having three parallel passages therein, disposed at equal intervals from each other and with respect to a centerline common to all three sections, one end of each of said passages being coplanar with comparable ends of the other passages, said center section also having a sidewall in which three output ports are disposed at equal intervals, with each output port connecting to a respective one of said passages, said base section having an exhaust port for purging air, a shaft rotatably journaled on the centerline of said center section, with motor means provided for driving said shaft in rotation, a ball valve being disposed at the end of each of said passages remote from said coplanar ends, with each ball normally being biased into contact with its seat so as to effect closure of that end of its passage, a sector member disposed adjacent the coplanar ends of said passages remote from said ball valves, said sector member having an open portion of greater than 120°, and a closed portion of less than 240°, said sector member being connected so as to be driven in rotation by said shaft, said sector member serving a valving function with respect to said coplanar passage ends in that such end of each passage is closed to the entry of compressed air from said air receiving section when the closed portion of said sector member extends thereover, and a cam member mounted to be driven in rotation by said shaft and being located immediately adjacent said ball valves, said cam member being configured to successively intercept each ball as said shaft rotates, with said cam member causing an intercepted ball to move off its seat for a limited time and therefore temporarily open the end of a passage remote from said sector member, said cam member being in a pre-established phase with the closed portion of said sector member such that at a given movement, either the one end or the other end of each passage is open, but never both ends open at the same time.

20. The rotary pressure/purge valve as recited in claim 19 in which said sector member is continuously exposed to the full pressure of the compressed air in said air receiving section, the pressure of the compressed air serving to keep said sector member in a close-fitting relationship with said coplanar passage ends, to assure against undesirable leakage.

21. The rotary pressure/purge valve as recited in claim 19 in which said sector member and said cam member are set in an opposed relationship, such that when full pressure charging air is flowing through one of said passages, initial pressurizing air is flowing through a second passage, and purging air is flowing in an opposite direction through a third passage, each in turn and in sequence as said sector member and said cam member each continue to rotate through each complete 360° cycle.

22. The rotary pressure/purge valve as recited in claim 19 in which said sector member is continuously exposed to the full pressure of the compressed air in said air receiving section, the pressure of the compressed air serving to keep said sector member in a close-fitting relationship with said coplanar passage ends, to assure against undesirable leakage, said sector member and said cam member being arranged in an opposed relationship, such that when full pressure charging air is flowing through one of said passages, initial pressurizing air is flowing through a second passage, and purging air is flowing in an opposite direction through a third passage, each in turn and in sequence as said sector member and said cam member each continue to rotate through each complete 360° cycle.

23. The rotary pressure/purge valve as recited in claim 19 in which said sections are constructed of transparent plastic, with adjacent sections being secured together by the use of screw threads.

24. An oxygen supplying unit utilizing a rotary pressure/purge valve for providing high quality, pulsation-free oxygen without the use of an oxygen tank, said valve comprising an air chamber section, a center section, and a source of purging air, said air chamber section having an inlet port for compressed air, said center section having a plurality of passages therein, disposed at equal intervals from each other and with respect to a centerline common to both sections, said center section and therefore said passages having first and second ends, first valve means operatively associated with said first passage ends, and serving to control the entry of charging air into two adjacent passages at the same time, said second valve means operatively associated with said second ends of said passages and serving to control the exit of purging air from said passages, said center section having a separate output port connecting to each of said passages, a shaft rotatably journaled on the centerline of said center section, with said shaft being connected to rotation producing means, said first valve means and said second valve means each having a portion that is operated by said shaft, with said first and second valve means being set out of phase such that when a first end of a given passage is closed to the entry of charging air, the other end of that passage is open to a flow of purging air, and vice versa, whereby at a given moment compressed air can flow in one direction through at least one of said first valve means and an associated passage, contemporaneously with purging air flowing in a different direction through a different one of said passages, said unit also having a manifold means utilizing a plurality of check valves permitting flow of oxygen-enriched air in one direction but not the other, said check valves being arranged to sustain the oxygen delivery pressure from said unit at an approximately constant, relatively high pressure.

25. An oxygen supplying unit utilizing a rotary pressure/purge valve for providing high quality, pulsation-free oxygen without the use of an oxygen tank, said valve comprising an air chamber section, a center section and a base section, said air chamber section having an inlet port for compressed air, said center section having a plurality of parallel passages therein, disposed at equal intervals from each other and with respect to a centerline common to all three sections, said passages having one set of ends terminating in a common plane, said base section having an exhaust port for purging air, first valve means operatively associated with said coplanar passage ends, and serving to control the entry of charging air into two adjacent passages at the same time, and second valve means associated with the other ends of said passages and serving to control the exit of purging air from said passages, said center section having a sidewall in which output ports are disposed at essentially equal intervals, with each output port connecting to a respective one of said passages, a shaft rotatably journaled on the centerline of said center section, with one end of said shaft being connected to motor means, said first valve means and said second valve means each having a portion that is operated by the rotation of said shaft, with said first and second valve means being set out of phase such that when a first end of a given passage is closed to the entry of charging air, the other end of that passage is open to the flow of purging air, and vice versa, whereby compressed air can flow in one direction through at least one of said first valve means and an associated passage at a given moment, with purging air contemporaneously flowing in a different direction through a different one of said passages, said unit also having a manifold means utilizing a plurality of check valves permitting flow of oxygen-enriched air in one direction but not the other, said check valves being arranged to sustain the oxygen delivery pressure from said unit at an approximately constant, relatively high pressure.

26. The oxygen supplying unit as recited in claim 25 in which said first and second valve means are set in opposition in such a manner that when full pressure charging air is flowing through a first of said passages, initial pressurization air is flowing through a second passage, and purging air is flowing in an opposite direction through a third passage, each in turn and in sequence, as both of said first and second valve means continue to rotate through each 360° cycle.

27. The oxygen supplying unit as recited in claim 25 in which said first valve means is a sector member having an open portion of an angular extent greater than 120°, and a closed portion of an angular extent less than 240°.

28. The oxygen supplying unit as recited in claim 25 in which said second valve means is represented by a plurality of ball valves utilized in conjunction with a rotary cam member, with the ball of each valve being normally biased into sealing relation with its respective seat, and said cam member being disposed in operative relation with respect to said balls, such that as said cam member is caused by said shaft to rotate, each of said balls is successively moved to an open condition, after which each ball is permitted to close under the influence of its bias.

* * * * *

UNITED STATES PATENT OFFICE
CERTIFICATE OF CORRECTION

Patent No. 4,787,417               Dated   November 29, 1988

Inventor(s) John F. Windsor, Jr.

It is certified that error appears in the above-identified patent and that said Letters Patent are hereby corrected as shown below:

Column 4, line 12, after "system." begin a new paragraph with the words --It is therefore to be seen that the instant pneumatically--.

Column 4, line 32, change "warehousing/s-torage" to --warehousing/storage--.

Column 10, line 22, after "which" insert --may hereinafter be referred to as the second valve means. In--.

Column 11, line 25, after "bed" insert --material then becomes saturated and will no longer produce--.

Signed and Sealed this

Fourth Day of April, 1989

Attest:

DONALD J. QUIGG

Attesting Officer

Commissioner of Patents and Trademarks